United States Patent
Hyo (10) Patent No.: US 9,767,398 B2
(45) Date of Patent: Sep. 19, 2017

(54) INFORMATION PROCESSING APPARATUS, INFORMATION PROCESSING SYSTEM, AND INFORMATION PROCESSING METHOD

(71) Applicant: Kiyohiro Hyo, Tokyo (JP)

(72) Inventor: Kiyohiro Hyo, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/588,656

(22) Filed: Jan. 2, 2015

(65) Prior Publication Data

US 2015/0116774 A1 Apr. 30, 2015

Related U.S. Application Data

(63) Continuation of application No. 13/790,181, filed on Mar. 8, 2013, now Pat. No. 8,953,186.

(30) Foreign Application Priority Data

Mar. 16, 2012 (JP) .................. 2012-061212

(51) Int. Cl.
- G06F 3/12 (2006.01)
- G06K 15/00 (2006.01)
- G06K 15/02 (2006.01)
- G06Q 10/06 (2012.01)
- G06Q 10/10 (2012.01)

(52) U.S. Cl.
CPC ....... *G06K 15/1894* (2013.01); *G06F 3/1296* (2013.01); *G06Q 10/06* (2013.01); *G06Q 10/10* (2013.01)

(58) Field of Classification Search
None
See application file for complete search history.

(56) References Cited

U.S. PATENT DOCUMENTS

| | | | |
|---|---|---|---|
| 2002/0144162 A1 | 10/2002 | Tada et al. | |
| 2004/0246512 A1* | 12/2004 | Miyamoto | ................. B41J 2/04 358/1.13 |
| 2005/0071483 A1 | 3/2005 | Motoyama | |
| 2008/0003033 A1 | 1/2008 | Aizawa | |
| 2008/0007775 A1 | 1/2008 | Mizobuchi et al. | |
| 2008/0065757 A1 | 3/2008 | Motoyama et al. | |
| 2008/0180704 A1 | 7/2008 | Kametani | |
| 2008/0181648 A1 | 7/2008 | Makishima et al. | |
| 2010/0149575 A1 | 6/2010 | Ozawa et al. | |
| 2010/0171751 A1 | 7/2010 | Kim | |

(Continued)

FOREIGN PATENT DOCUMENTS

| | | |
|---|---|---|
| JP | 2005-108217 | 4/2005 |
| JP | 2008-077649 | 4/2008 |
| JP | 2013-117945 | 6/2013 |

*Primary Examiner* — Moustapha Diaby
(74) *Attorney, Agent, or Firm* — Oblon, McClelland, Maier & Neustadt, L.L.P.

(57) ABSTRACT

An information processing apparatus includes a receiving unit configured to receive output object information on an object to be output; a storage unit configured to store therein output device information on different types of output devices; and a determining unit configured to determine an output device based on the output object information and the output device information.

19 Claims, 8 Drawing Sheets

152

| EVENT TYPE | OUTPUT MODE | OUTPUT INFORMATION |
|---|---|---|
| VIDEO CONFERENCE | REPRODUCTION, PRINTING | TIME |
| ORDINARY MEETING | PRINTING, PRINTING | SHEET COUNT |
| PROJECTOR MEETING | PROJECTION, PRINTING | TIME |
| ⋮ | ⋮ | ⋮ |

(56) References Cited

U.S. PATENT DOCUMENTS

| | | | | |
|---|---|---|---|---|
| 2010/0174935 A1* | 7/2010 | Kim | ................... | G03G 15/5004 |
| | | | | 713/324 |
| 2010/0315665 A1* | 12/2010 | Ebisui | ................... | G06F 3/1213 |
| | | | | 358/1.14 |
| 2010/0322661 A1 | 12/2010 | Yamamichi | | |
| 2011/0113430 A1* | 5/2011 | Fuse | ..................... | G06Q 10/06 |
| | | | | 718/102 |
| 2011/0231026 A1* | 9/2011 | Yaoyama | ........... | G03G 15/5004 |
| | | | | 700/291 |
| 2011/0273737 A1 | 11/2011 | Hirao | | |
| 2012/0053885 A1* | 3/2012 | Kato | ..................... | G06F 3/1221 |
| | | | | 702/128 |

\* cited by examiner

| MODEL NAME | ID | DIVISION NAME | PROCESSING EFFICIENCY INFORMATION |
|---|---|---|---|
| MFPXX01 | 000001 | DEVELOPMENT | |
| MFPXX02 | 000002 | DEVELOPMENT | |
| MFPXX03 | 000003 | INTELLECTUAL PROPERTY | |
| MFPXX04 | 000004 | PLANNING | |
| ⋮ | ⋮ | ⋮ | |
| PROJECTOR 1 | 111111 | DEVELOPMENT | |
| PROJECTOR 2 | 222222 | DEVELOPMENT | |
| PROJECTOR 3 | 111333 | INTELLECTUAL PROPERTY | |
| PROJECTOR 4 | 222444 | SALES | |
| ⋮ | ⋮ | ⋮ | |

| EVENT TYPE | OUTPUT MODE | OUTPUT INFORMATION |
|---|---|---|
| VIDEO CONFERENCE | REPRODUCTION, PRINTING | TIME |
| ORDINARY MEETING | PRINTING, PRINTING | SHEET COUNT |
| PROJECTOR MEETING | PROJECTION, PRINTING | TIME |
| ⋮ | ⋮ | ⋮ |

| OUTPUT MODE | OUTPUT UNIT | ID |
|---|---|---|
| REPRODUCTION | DISPLAY FUNCTION | XXXXXX TO XXXXXX |
| PRINTING | PRINTING FUNCTION | XXXXXX TO XXXXXX |
| PROJECTION | PROJECTING FUNCTION | XXXXXX TO XXXXXX |
| ⋮ | ⋮ | ⋮ |

| MODEL NAME | ID | MODEL | INSTALLED DIVISION NAME | APPLICABLE MONTH | POWER CONSUMPTION (kWh) ||||| TOTAL POWER CONSUMPTION | TOTAL CO₂ DISCHARGE AMOUNT — CO₂ DISCHARGE AMOUNT (kg-CO₂) | SHEET OUTPUT COUNT || CO₂ DISCHARGE AMOUNT (ESTIMATE FROM SHEET OUTPUT) — CO₂ DISCHARGE AMOUNT (kg-CO₂) | TOTAL CO₂ DISCHARGE AMOUNT — CO₂ DISCHARGE AMOUNT (kg-CO₂) |
|---|---|---|---|---|---|---|---|---|---|---|---|---|---|---|---|
| | | | | | OPERATING MODE | READY MODE | PANEL OFF | ENERGY SAVING MODE | SLEEP MODE | | | OUTPUT SURFACE COUNT | OUTPUT SHEET COUNT (ESTIMATE) | | |
| TOTAL | | | | | 29.39 | 18.18 | 68.42 | 0.96 | 12.80 | 129.73 | 72.00 | 330000 | 270000 | 114.31 | 186.32 |
| MFPXX01 | 000001 | MODEL XXX | DEVELOPMENT | FEB 2009 | 15.40 | 10.29 | 31.64 | 0.52 | 6.56 | 64.41 | 35.75 | 160000 | 140000 | 58.84 | 94.59 |
| MFPXX02 | 000002 | MODEL XXX | DEVELOPMENT | FEB 2009 | 13.98 | 7.89 | 36.78 | 0.44 | 6.24 | 65.32 | 36.26 | 170000 | 130000 | 55.47 | 91.73 |

```
MEETING
ATTENDEES    : _____ PEOPLE

MEETING TIME : _____ HOURS

MEETING MODE : _____ MEETING
                 |
                 |→  · PRINTING    : REQUIRED /
                                    NOT REQUIRED
                     · SHEET
                       COUNT       : _____ SHEETS
```

| | |
|---|---|
| ·NAME OF DEVICE HAVING HIGHEST PROCESSING EFFICIENCY | : ○○○○○○ |
| ·INSTALLATION SITE HAVING HIGHEST PROCESSING EFFICIENCY | : ○○○○○○ |
| ·PROCESSING EFFICIENCY - $CO_2$ DISCHARGE AMOUNT | : ○○○○○○ |
| ·PROCESSING EFFICIENCY - POWER CONSUMPTION | : ○○○○○○ |

INFORMATION PROCESSING APPARATUS, INFORMATION PROCESSING SYSTEM, AND INFORMATION PROCESSING METHOD

CROSS-REFERENCE TO RELATED APPLICATION

This application is a Continuation of U.S. patent application Ser. No. 13/790,181, filed Mar. 8, 2013, and is based upon and claims the benefit of priority from Japanese Patent Application No. 2012-061212 filed in Japan on Mar. 16, 2012, the entire content of each of the foregoing applications is incorporated herein by reference.

BACKGROUND OF THE INVENTION

1. Field of the Invention

The present invention relates to an information processing apparatus, an information processing system, and an information processing method.

2. Description of the Related Art

Companies have been providing services for monitoring information on output devices, such as image forming apparatuses, on networks.

For example, Japanese Patent Application Laid-open No. 2005-108217 discloses a technique that, in order to access a monitored device among individual devices communicably connected to a network, accesses external information storage using at least one communications protocol supported by the device, stores in an internal storage table information for accessing the device acquired from the external information storage, selects a communications protocol from among a plurality of communications protocols, and accesses the device using the selected communications protocol and the information stored in the internal storage table.

Japanese Patent Application Laid-open No. 2008-77649 discloses a method for acquiring information related to a monitored device on a network using HTTP. The method is intended to acquire a uniform vendor name and/or product model name when a vendor name and/or product model name is different.

It has, however, been difficult with the related-art techniques to determine, out of a plurality of output devices that perform various types of processing, an output device according to output object information including information on an object of interest to be output.

Therefore, there is a need to provide an information processing apparatus, an information processing system, and an information processing method that can determine, out of a plurality of output devices, an output device according to output object information including information on an object of interest to be output.

SUMMARY OF THE INVENTION

It is an object of the present invention to at least partially solve the problems in the conventional technology.

According to an embodiment, there is provided an information processing apparatus that includes a receiving unit configured to receive output object information on an object to be output; a storage unit configured to store therein output device information on different types of output devices; and a determining unit configured to determine an output device based on the output object information and the output device information.

According to another embodiment, there is provided an information processing system that includes different types of output devices; and an information processing apparatus connected to the output devices over a network. The information processing apparatus includes a receiving unit configured to receive output object information on an object to be output; a storage unit configured to store therein output device information on the output devices; and a determining unit configured to determine an output device based on the output object information and the output device information.

According to still another embodiment, there is provided an information processing method executed in an information processing system that includes different types of output devices and an information processing apparatus connected to the output devices over a network. The information processing method includes receiving output object information on an object to be output; and determining an output device based on output object information on the output devices stored in a storage unit and the output device information.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

A preferred embodiment of the present invention will be described in detail below with reference to the accompanying drawings.

Figure 1:
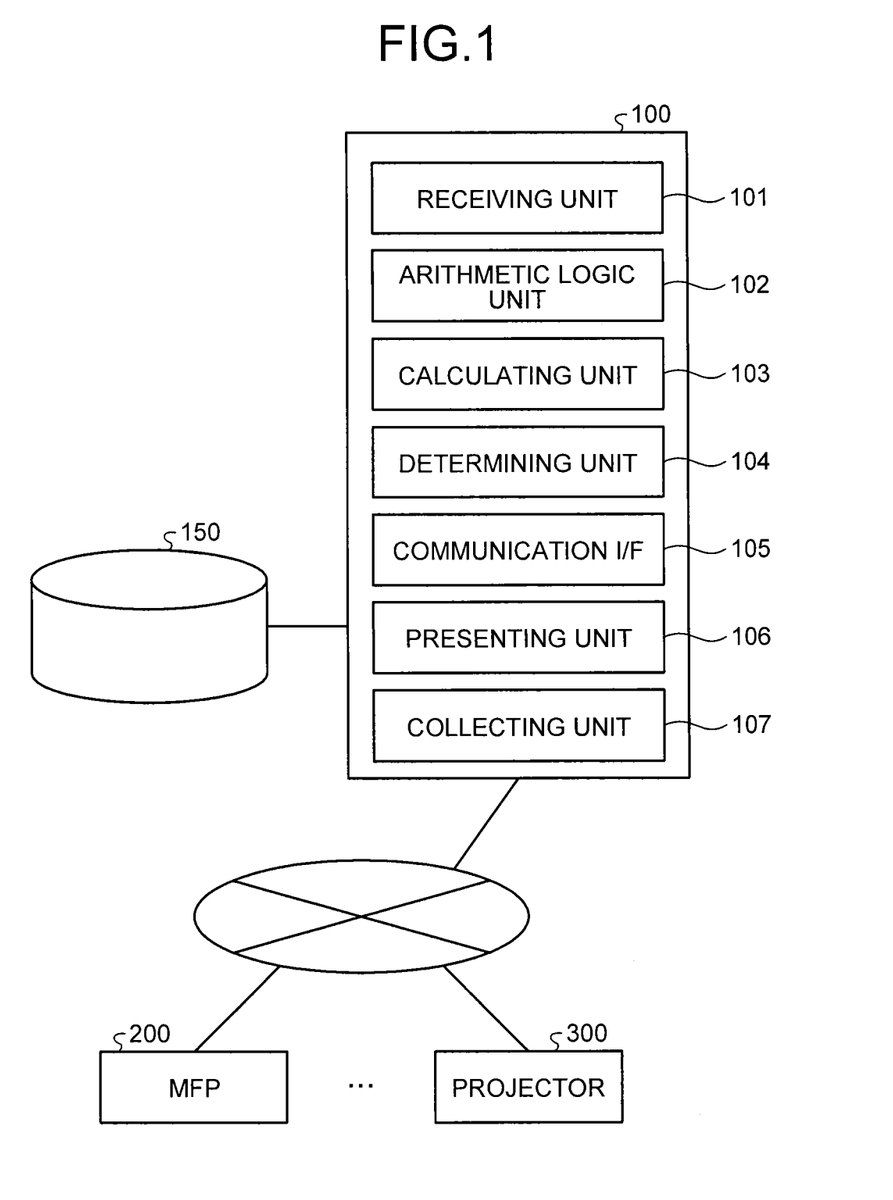
FIG. 1 is a block diagram illustrating a network configuration of an information processing system and a functional configuration of an information processing apparatus according to an embodiment of the present invention.

FIG. 1 is a block diagram illustrating a network configuration of an information processing system and a functional configuration of an information processing apparatus according to the embodiment of the present invention. The information processing system according to the embodiment of the present invention includes a plurality of output devices, such as an MFP 200 and a projector 300, and an information processing apparatus 100 connected to a network, such as the Internet and a local area network (LAN). The output devices connected to the information processing apparatus 100 include different types of output devices, such as the MFP 200 and the projector 300 of the embodiment of the present invention.

The MFP 200 is an image forming apparatus having at least any two of a copier function, a printer function, a scanner function, and a facsimile function. In the embodiment of the present invention, the MFP 200 has at least the printer function. The projector 300 has an image display function for projecting as an image a still image or a moving image on a projection surface, such as a screen and a wall.

In the embodiment of the present invention, the output devices exemplarily include the MFP 200 and the projector 300. These are, however, not the only possible output devices; alternatively, the output devices may include, for example, a copier, a scanner, a printer, a facsimile, or any image forming apparatus other than the MFP, and other information output devices (e.g. a personal computer, portable terminals such as a smart phone, and a video conference system).

Each of the output devices including the MFP 200 and the projector 300 transmits output device information relating to each of the output devices to the information processing apparatus 100 at predetermined timing. The output device information includes usage information that indicates usage of each of the output devices. Non-limiting examples of the predetermined timing include various types of timing, such as at every predetermined period of time, upon receipt of a request from the information processing apparatus 100, and upon performance of a predetermined operation.

The information processing apparatus 100 manages the output devices connected to the network. Referring to FIG. 1, the information processing apparatus 100 mainly includes a receiving unit 101, an arithmetic logic unit 102, a calculating unit 103, a determining unit 104, a communication interface 105 (hereinafter referred to as a "communication I/F 105"), and a presenting unit 106.

The information processing apparatus 100 is also connected to a storage unit 150. The storage unit 150 is a storage medium, such as a hard disk drive (HDD) and a storage device. The storage unit 150 may be configured separately from the information processing apparatus 100, in addition to being configured as part of the information processing apparatus 100. The storage unit 150 stores therein the output device information of each of the output devices.

The output device information is associated with each of the output devices and includes the usage information indicating usage of each of the output devices and processing efficiency information indicating processing efficiency of each of the output devices.

In the embodiment, the storage unit 150 stores therein, as the output device information, various types of data including an output device management database (hereinafter referred to as an "output device management DB") 151, an output mode database (hereinafter referred to as an "output mode DB") 152, an output management database (hereinafter referred to as an "output management DB") 153, and usage information 154.

Figure 2:
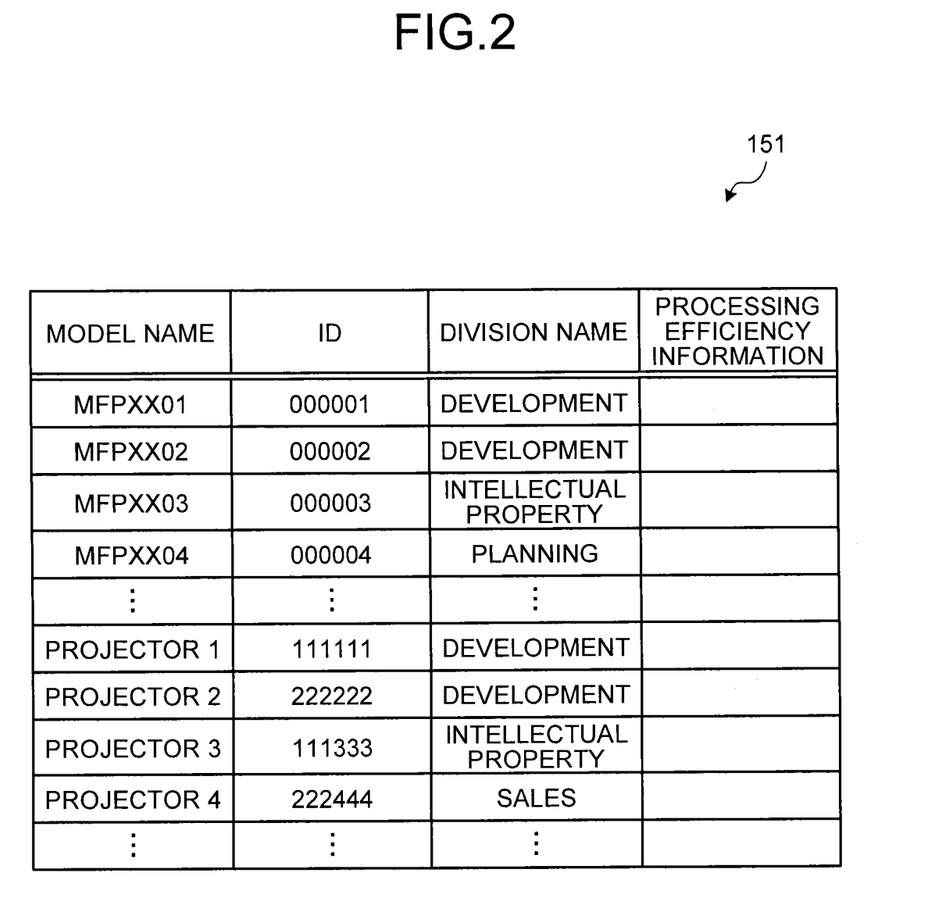
FIG. 2 is a diagram illustrating an exemplary output device management database (DB)

The output device management DB 151 is a database for managing the output devices connected to the network. FIG. 2 is a diagram illustrating an exemplary output device management DB 151. Referring to FIG. 2, the output device management DB 151 registers a model name of each output device, associated with a corresponding ID, a name of a corresponding division that owns the output device, and corresponding processing efficiency per unit time. The division name is referred to when the usage information is tallied for each division or for related purposes. The ID is identification information for uniquely identifying an output device.

The processing efficiency per unit time indicates an efficiency of processing that can be performed per unit time in an output unit that achieves various types of processing in each output device. The output unit is included in each output device, indicating a function for achieving a corresponding output mode. Examples of the output unit include, but not limited to, a function of displaying an image, a function of printing an image, and a function of projecting an image. The processing efficiency per unit time are, specifically, for example, power consumption per unit time, an amount of carbon dioxide discharged per unit time (hereinafter may be referred to as a "$CO_2$ discharge amount"), and throughput per unit when the output unit included in each output device performs processing that can be achieved thereby. Examples of the throughput per unit time include, for example, an output (e.g. display, projection, printing, data transfer) speed per unit time.

The processing efficiency per unit time of each output device may be stored in advance in the output device management DB 151 as associated with the output device. The processing efficiency per unit time of each output device may alternatively be calculated and updated through processing by the information processing apparatus 100 to be described later.

Figure 3:
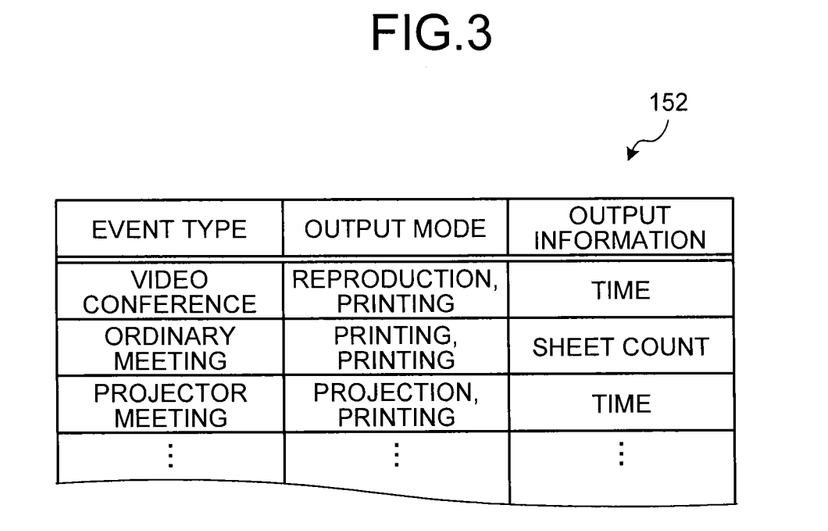
FIG. 3 is a diagram illustrating an exemplary output mode DB.

The output mode DB 152 is a database for managing an output mode of the output unit included in each output device connected to the network. FIG. 3 is a diagram illustrating an exemplary output mode DB 152. Referring to FIG. 3, the output mode DB 152 registers an event type associated with a corresponding output mode.

The event type is a type of an event (a ceremony or other occasion) that requires an output of output information by each output device. Examples of the event type include a video conference, an ordinary meeting, and a projector meeting. In the embodiment of the present invention, the video conference requires, as an output performed by each output device, an output of the output mode, for example, reproduction of an image and printing of a document. The ordinary meeting requires, as an output performed by each output device, an output of the output mode, for example, printing of a document used in the ordinary meeting to a paper medium and projection of an image. The projector meeting requires, as an output performed by each output device, an output of the output mode, for example, projection of an image and printing of a document. Types of the output mode corresponding to each event type are not limited to what are recited above.

The event type indicates an output mode of information in the event identified by the above event type. Examples of the output mode include, but not limited to, reproduction of an image, printing of an image, and projection of an image.

Figure 4:
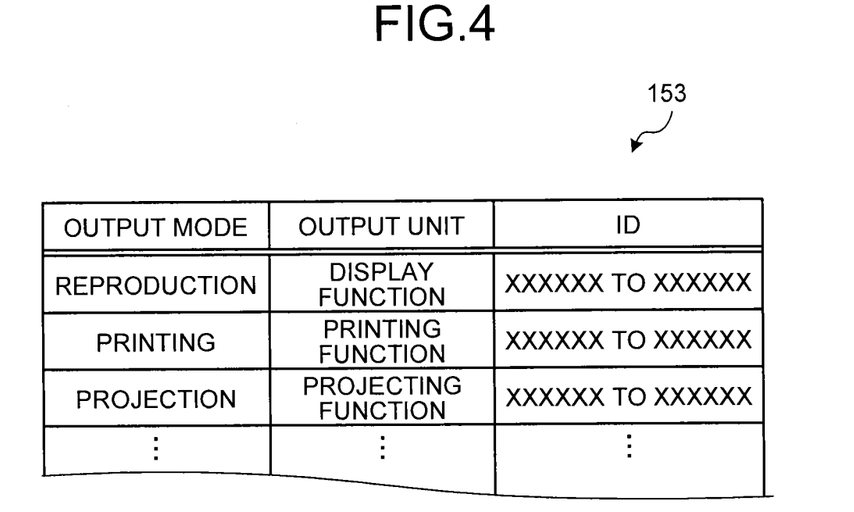
FIG. 4 is a diagram illustrating an exemplary output management DB.

The output management DB 153 is a database for managing the output mode and the output unit that can be achieved in each output device. FIG. 4 is a diagram illustrating an exemplary output management DB 153. Referring to FIG. 4, the output management DB 153 registers an output mode that can be achieved in the output unit of each output device, associated with a corresponding output unit for achieving the output mode and a corresponding ID of each output device.

The output mode indicates the output mode of the output information. Examples of the output mode include, but not limited to, reproduction of an image, printing of an image, and projection of an image. The output information refers to information on an object of interest to be output on each output device. Examples of the output information include, but not limited to, image data, voice data, moving image data, and document data of a document to be printed.

Specifically, the output management DB 153 manages the output unit that assumes a function of each output device connected to the network and the output mode that can be achieved by the output unit included in each output device.

The usage information 154 indicates usage of each output device. The usage information 154 may include information that is unique only to each output device. The usage information 154 is received from each output device and stored in the storage unit 150.

Figure 5:
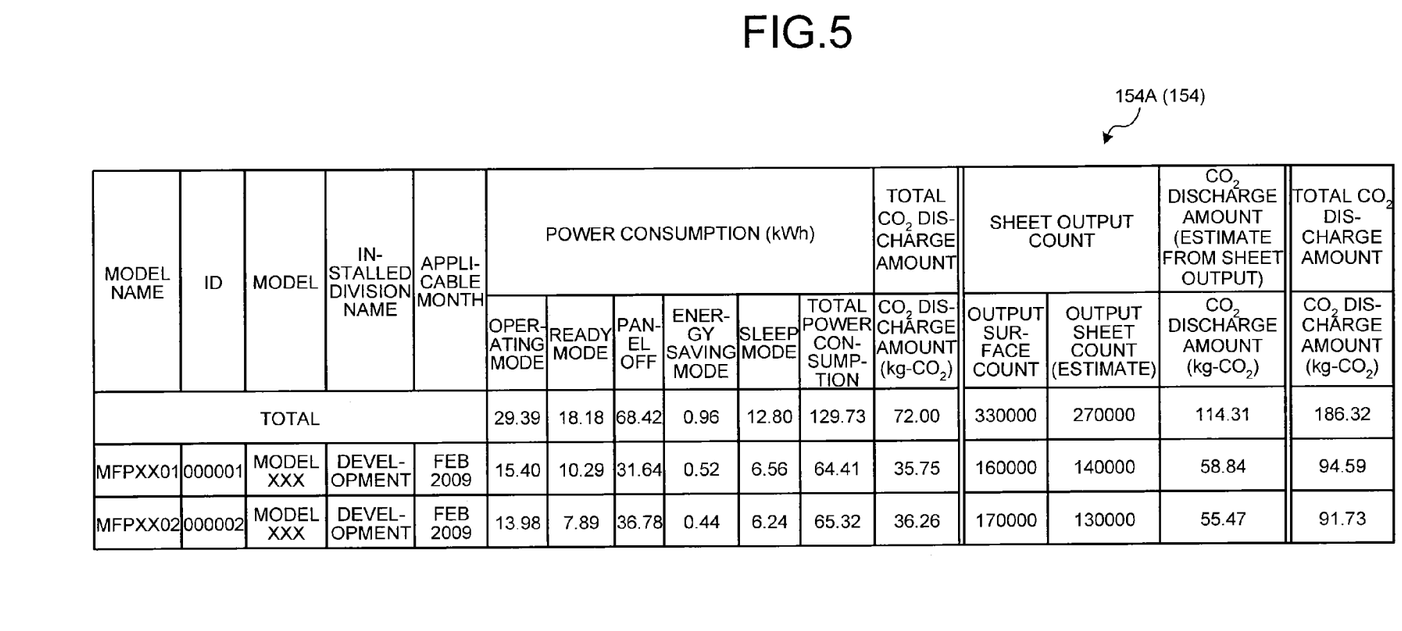
FIG. 5 is a diagram illustrating exemplary information on usage of MFPs.

FIG. 5 is a diagram illustrating exemplary usage information 154A of the MFP 200 as an example of the usage information 154. Referring to FIG. 5, the usage information 154A of the MFP 200 registers, in addition to control items, such as a model name, a serial number (ID), a model, an installed division, and an applicable month, information indicating usage that corresponds to such management items as power consumption, a $CO_2$ discharge amount, and a sheet output count. It is noted that, of the usage information items recited above, the power consumption and the $CO_2$ discharge amount are used also as the processing efficiency information indicating the processing efficiency of the MFP 200.

Figure 6:
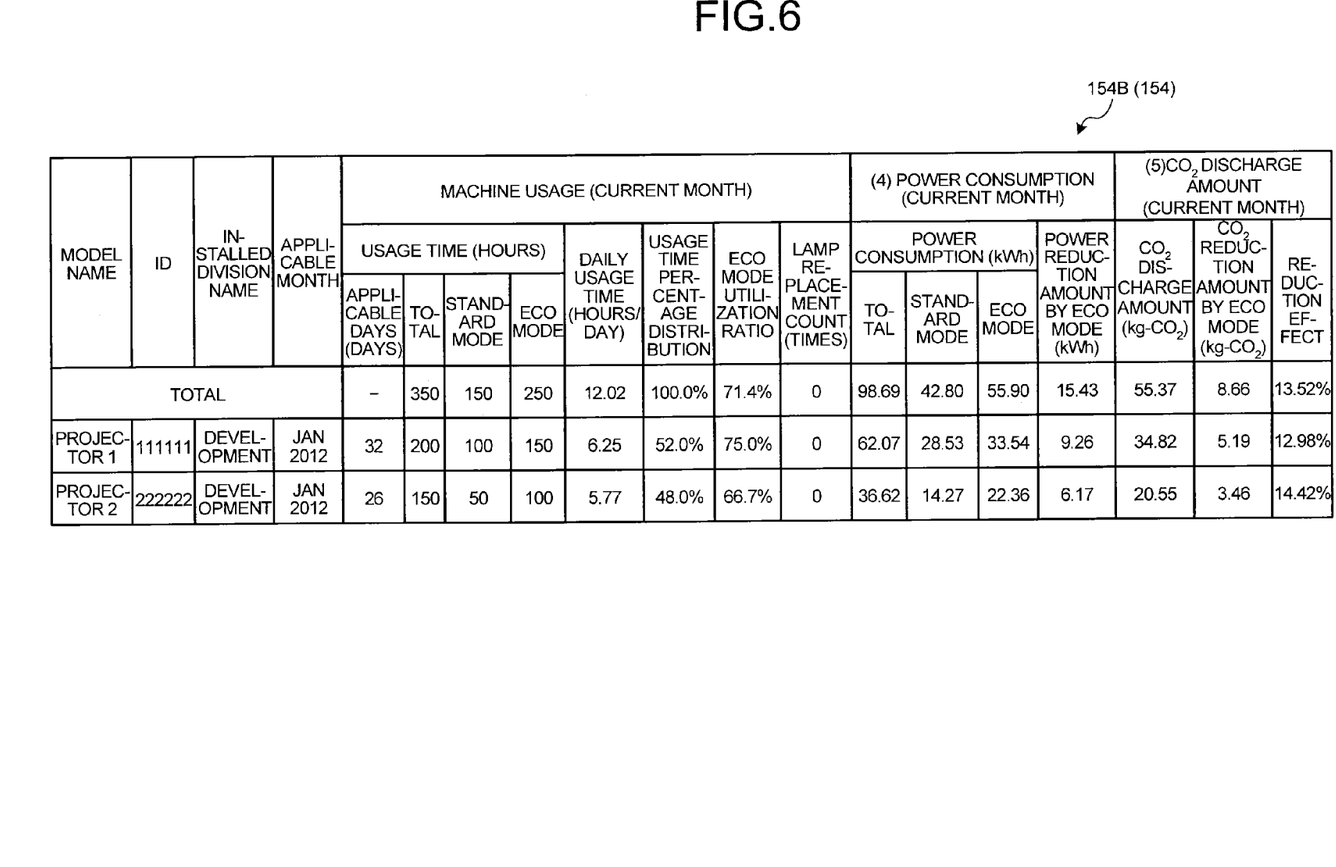
FIG. 6 is a diagram illustrating exemplary information on usage of projectors.

FIG. 6 is a diagram illustrating exemplary usage information 154B of the projector 300. Referring to FIG. 6, the usage information 154B of the projector 300 registers, in addition to control items, such as a model name, a serial number (ID), a model, an installed division, and an applicable month, information indicating usage that corresponds to such control items as usage time, power consumption, a $CO_2$ discharge amount, and a $CO_2$ reduction amount. It is noted that, of the usage information items recited above, the power consumption, the $CO_2$ discharge amount, and the $CO_2$ reduction amount are used also as the processing efficiency information indicating the processing efficiency of the MFP 200.

Referring back to FIG. 1, the communication I/F 105 is a communication device, such as a network board.

A collecting unit 107 collects the usage information 154 from each of the output devices including the MFP 200 and the projector 300 by receiving the usage information 154 through the communication I/F 105. The collecting unit 107 stores the collected usage information 154 in the storage unit 150.

The receiving unit 101 receives output object information from a user. The output object information refers to information on each of the output devices connected to the network. In the embodiment, the output object information includes information on an information volume of an object of interest to be output. The information volume of an object of interest to be output indicates a volume of information of the output information of an object of interest to be output (the "object of interest to be output" will hereinafter be referred to as the "output object") (to be described in detail later). The output information refers to information used through output in an event that requires processing performed in an output unit included in at least one output device out of the output devices. Examples of the output information include, but not limited to, image data, voice data, moving image data, and document data of a document to be printed as described earlier.

The information volume indicates the volume of information of the output object. The information volume includes information on the number of people who share the output object. The information volume also includes information on time relating to the sharing of the output object. Specifically, the output object information includes information on the number of people who share the output object and on time relating to the sharing of the output object. More specifically, in the embodiment, the receiving unit 101 receives as the information volume the number of sheets of documents to be used per one session of a meeting, meeting attendees as the number of attendees at a meeting, meeting time, availability of a handout, and the number of pages of documents to be distributed to each person. In this case, the "meeting attendees" corresponds to the information on the number of people who share the output object and the "meeting time" corresponds to the information on the time relating to the sharing of the output object.

The output object information received by the receiving unit 101 may further include additional information. For example, the output object information may further include the event type and the output information.

In the embodiment, the information processing apparatus 100 displays an output object information receiving screen on the presenting unit 106. Through the output object information receiving screen, the information processing apparatus 100 lets the user input the output object information and the receiving unit 101 receives the output object information thus input.

Figure 7:
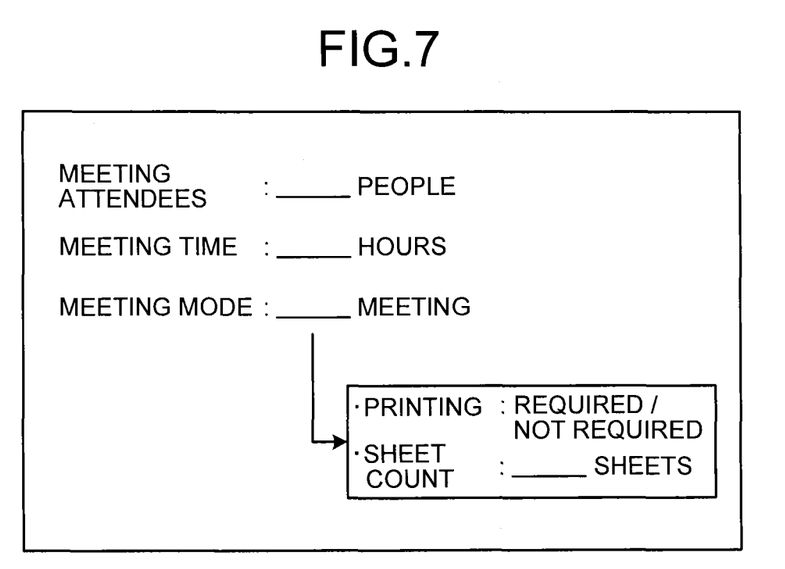
FIG. 7 is a diagram illustrating an exemplary input screen.

FIG. 7 is a diagram illustrating an exemplary output object information receiving screen. The output object information receiving screen is displayed on the presenting unit 106 to be described later. Referring to FIG. 7, from the output object information receiving screen, the meeting attendees as the number of attendees at one session of a meeting, meeting time per session, whether printing is required or not, and the number of sheets of documents to be distributed to each person are input as the information indicating the information volume. In the embodiment, a meeting mode is further input. The meeting mode corresponds to the event type.

Referring back to FIG. 1, the arithmetic logic unit 102 calculates the processing efficiency of each output device based on the usage information 154 of each of the output devices stored in the storage unit 150.

For example, arithmetic logic unit 102 calculates the processing efficiency per unit time from the information relating to the processing efficiency included in the usage information 154 of each output device. The arithmetic logic unit 102 then registers the processing efficiency per unit time in the output device management DB 151 of the storage unit 150 by associating the processing efficiency per unit time with the ID of the corresponding output device.

Specifically, referring to FIG. 5, the arithmetic logic unit 102 reads the power consumption for one month (total power consumption) and operating time (omitted in FIG. 5) that assume data relating to the processing efficiency in the usage information 154A of the MFP 200 as an example of the usage information 154. The arithmetic logic unit 102 then calculates the power consumption per unit time as the processing efficiency per unit time of the MFP 200. The arithmetic logic unit 102 further multiplies the power consumption during printing (total power consumption) that represents the data relating to the processing efficiency in the usage information 154A of the MFP 200 by a predetermined $CO_2$ discharge amount calculating coefficient to thereby find the $CO_2$ discharge amount resulting from power consumption during printing. In addition, the arithmetic logic unit 102 reads an estimate of the $CO_2$ discharge amount resulting from sheet output in the usage information 154A of the MFP 200. Then, the arithmetic logic unit 102 adds the estimate of the $CO_2$ discharge amount resulting from sheet output and the $CO_2$ discharge amount resulting from the power consumption during printing to thereby find the $CO_2$ discharge amount per month in the MFP 200. Additionally, the arithmetic logic unit 102 calculates from the $CO_2$ discharge amount per month and the operating time (omitted in FIG. 5) the $CO_2$ discharge amount per unit time and stores the result as the processing efficiency per unit time in the storage unit 150.

In FIG. 5, the processing efficiency per unit time of each output device has been calculated in advance on the side of each output device, so that the arithmetic logic unit 102 may calculate the processing efficiency per unit time of each output device by reading the usage information 154, or calculate the processing efficiency per unit time of each output device using data relating to the processing efficiency included in the usage information 154.

The arithmetic logic unit 102 reads the power consumption (current month) and the $CO_2$ discharge amount (current month) that assume data relating to the processing efficiency in the usage information 154B of the projector 300 (see FIG. 6) as an example of the usage information 154. Then, the arithmetic logic unit 102 calculates power consumption per unit time and $CO_2$ discharge amount per unit time from the usage time (total) of the current month. The arithmetic logic unit 102 then registers these calculated power consumption per unit time and $CO_2$ discharge amount per unit time that represent the processing efficiency per unit time of each output device in the output device management DB 151 of the storage unit 150.

Referring back to FIG. 1, the calculating unit 103 selects, out of the output devices connected to the network, a plurality of first output devices having output units that achieve an output of the output information of the information volume received by the receiving unit 101. In addition, the calculating unit 103 calculates the processing efficiency when each of the first output devices performs processing according to the information volume received by the receiving unit 101, based on the processing efficiency per unit time of each of the first output devices selected earlier.

More specifically, the calculating unit 103 first selects, out of the output devices connected to the network, the first output devices having the output units that achieve an output of the output information of the information volume received by the receiving unit 101. Specifically, the calculating unit 103, for example, reads from the output mode DB 152 output modes associated with the event information received by the receiving unit 101. Then, the calculating unit 103 reads from the output management DB 153 the output unit and the output device ID associated with each of the read output modes.

For example, if the receiving unit 101 has received the event type "ordinary meeting", the calculating unit 103 reads from the output mode DB 152 each of print and projection that are the output modes associated with the ordinary meeting. The calculating unit 103 then reads, from the output management DB 153, the device IDs associated with the "printing function" and the "projection function" that are the output units associated with the read output modes of print and projection.

The calculating unit 103 thereby selects, out of the output devices connected to the network, the first output devices having the output units that achieve an output of the output information of the information volume received by the receiving unit 101.

Next, the calculating unit 103 calculates the processing efficiency when each of the first output devices selected earlier performs processing according to the information volume included in the output object information received by the receiving unit 101.

If the output object information includes information on the number of people, the calculating unit 103 calculates processing efficiency when the output device (e.g. an image forming apparatus) outputs the output objects for the number of people. If the output object information includes information on a period of time, the calculating unit 103 calculates processing efficiency when the output device (e.g. an image display device) outputs the output object for the period of time based on the period of time.

In calculating the processing efficiency, the calculating unit 103 first translates processing efficiency when processing according to the information volume received by the receiving unit 101 is performed to corresponding second data that indicates processing efficiency of a kind among the first output devices.

The types of the second data indicating the common processing efficiency may be determined in advance by the calculating unit 103. For example, the second data may be a $CO_2$ calculated amount or power consumption. Specifically, as the processing efficiency corresponding to each of the first output devices, the calculating unit 103 translates the processing efficiency of different kinds, for example, the $CO_2$ calculated amount and the power consumption to corresponding second data indicating the processing efficiency of a kind, such as the $CO_2$ calculated amount or the power consumption.

Exemplary calculation of the second data performed by the calculating unit 103 will be described.

It is assumed that the output object information received by the receiving unit 101 has included information indicating the information volume, such as six meeting attendees, a 10-page handout, and 1 hour of meeting time. It is further assumed that, as the first output devices, one MFP 200 and one projector 300 have been selected. A case will be described in which the calculating unit 103 calculates power consumption as the second data indicating the processing efficiency of a common type. In this case, the calculating unit 103 calculates the second data indicating the processing efficiency of a common type as the second data of the MFP 200 as one of the first output devices using Equation (1) given below.

$$(6 \text{ people} \times 10 \text{ pages})/(\text{output speed(sheets/minute)} \times 60 \text{ minutes}) \times \text{power consumption per unit time} = \text{power consumption during printing (kWh)} \quad (1)$$

Similarly, the calculating unit 103 calculates the second data indicating the processing efficiency of a common type as the second data of the projector 300 as one of the first output devices using Equation (2) given below.

$$(1 \text{ hour(meeting time:projector utilization time)}) \times \text{power consumption per unit time} = \text{power consumption during projection} \quad (2)$$

The power consumption per unit time in Equations (1) and (2) may be read from the processing efficiency per unit time registered in the output device management DB 151.

It is noted that the calculating unit 103 may calculate the $CO_2$ discharge amount as the second data indicating the processing efficiency of a common type.

In this case, the calculating unit 103 calculates the second data indicating the processing efficiency of a common type as the second data of the MFP 200 as one of the first output devices using Equation (3) given below.

(Power consumption during printing)×$CO_2$ discharge amount calculating coefficient+estimate of the $CO_2$ discharge amount resulting from sheet output=$CO_2$ discharge amount during printing (3)

In Equation (3), the power consumption during printing is calculated using Equation (1) given earlier.

Additionally, the calculating unit 103 calculates the second data indicating the processing efficiency of a common type as the second data of the projector 300 as one of the first output devices using Equation (4) given below.

(Power consumption during projection)×$CO_2$ discharge amount calculating coefficient=$CO_2$ discharge amount during projection (4)

In Equation (4), the power consumption during projection is calculated using Equation (2) given earlier.

Referring back to FIG. 1, the determining unit 104 determines the output device based on the output object information received by the receiving unit 101 and the output device information stored in the storage unit 150. In the embodiment, based on the processing efficiency of each of the first output devices calculated by the calculating unit 103, the determining unit 104 determines a first output device having the highest processing efficiency as the output device to output the output information.

Specifically, if the second data is the $CO_2$ discharge amount, the determining unit 104 determines that the processing efficiency is higher with smaller values of the $CO_2$ discharge amount. If the second data is the power consumption, the determining unit 104 determines that the processing efficiency is higher with smaller values of the power consumption.

The presenting unit 106 presents various types of information. In the embodiment of the present invention, the presenting unit 106 displays the output object information receiving screen mentioned earlier and information indicating the output device determined by the determining unit 104. The presenting unit 106 may further display information indicating the processing efficiency when the output device determined by the determining unit 104 performs processing according to the information volume input through the output object information receiving screen.

Figure 8:
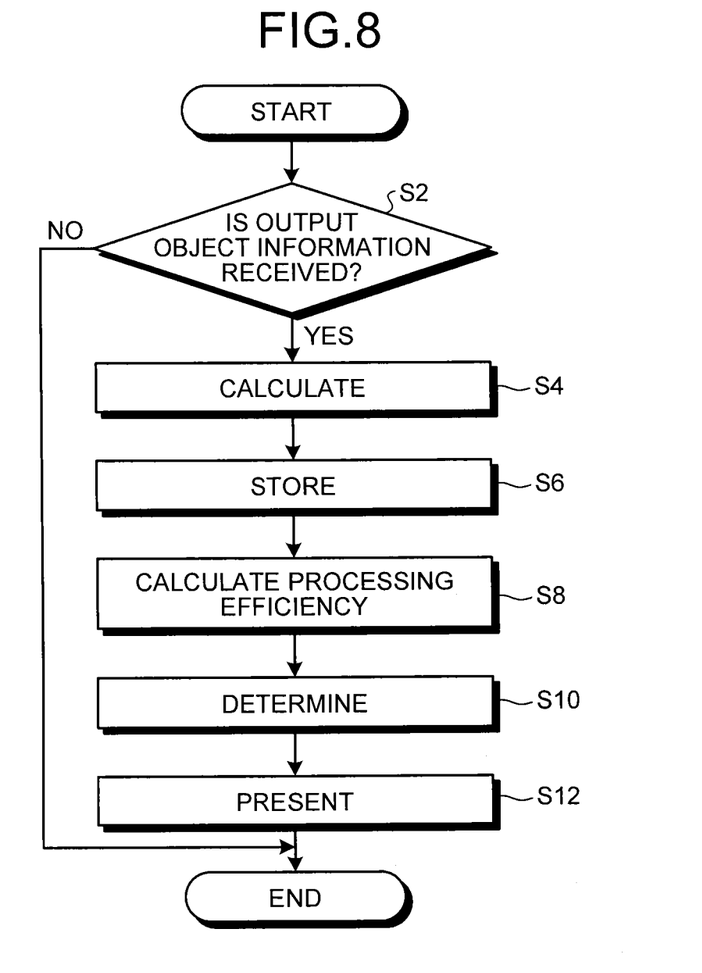
FIG. 8 is a flowchart illustrating steps in an determination process according to the embodiment of the present invention.

A determination process performed by the information processing apparatus 100 according to the embodiment as configured as described heretofore will be described below. FIG. 8 is a flowchart illustrating steps in the determination process performed by the information processing apparatus 100 according to the embodiment.

The collecting unit 107 is to receive to collect the usage information 154 from each of the output devices including the MFP 200 and the projector 300 and registers the collected usage information 154 in the storage unit 150.

The information processing apparatus 100 displays the output object information receiving screen illustrated in FIG. 7 on the presenting unit 106 and determines whether the receiving unit 101 has received an input of the output object information from the user (Step S2). If the answer at Step S2 is negative (No at Step S2), the routine is terminated. If the answer at Step S2 is affirmative (Yes at Step S2), the process proceeds to Step S4.

A case in the embodiment will be described in which the receiving unit 101 receives as the output object information the meeting attendees, the meeting time, the meeting mode, and the number of pages of a document per one person, and as the event information, the ordinary meeting.

Then, the arithmetic logic unit 102 calculates the processing efficiency of each of the output devices connected to the network (Step S4) and stores the result in the storage unit 150 (Step S6). If the storage unit 150 stores therein in advance the processing efficiency of each output device, the steps of Step S4 and Step S6 may be omitted.

Next, based on, out of the output devices connected to the network, a plurality of first output devices having output units that achieve an output of an information volume input at Step S2 and processing efficiencies per unit time of the first output devices, the calculating unit 103 calculates a processing efficiency when each of the first output devices performs processing according to the information volume (Step S8).

Then, the determining unit 104 determines, out of the processing efficiencies of the first output devices determined at Step S8, a first output device having the highest processing efficiency as the output device to output the output information (Step S10).

The information processing apparatus 100 then presents on the presenting unit 106 the output device determined at Step S10 and the processing efficiency when the output device performs the processing corresponding to the information volume included in the output object information input at Step S2 (Step S12).

The routine is then terminated.

It is noted that, in the processing at Step S10 described above, the determining unit 104 determines a plurality of first output devices as the first output device having the highest processing efficiency in some cases. This happens when there are a plurality of first output devices having the same processing efficiency. In this case, the determining unit 104 determines, out of the first output devices having the highest processing efficiency, a first output device having the lowest frequency of use. The frequency of use may be read from the usage information 154. Specifically, for example, the usage information 154 is formed to include cumulative operating time and a first output device having the smallest cumulative operating time is to be selected as the first output device having the lowest frequency of use.

This step suppresses occurrence of variations in the frequency of use among the output devices connected to the network.

Figure 9:
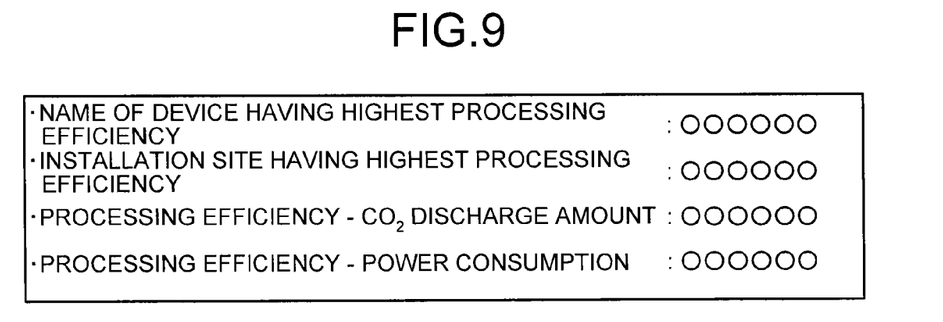
FIG. 9 is a diagram illustrating exemplary presented information.

The performance of the determination process from Step S2 to Step S12 results in, for example, information illustrated in FIG. 9 being displayed on the presenting unit 106.

FIG. 9 is a schematic diagram illustrating an exemplary output screen to be output. Referring to FIG. 9, the output screen displays information that determines the output device determined as the first output device having the highest processing efficiency when processing corresponding to the information volume included in the output object information received from the user is performed (e.g. a name the output device, an installation site of the output device) and the processing efficiency when the output device determined as the first output device having the highest processing efficiency performs the processing corresponding to the information volume included in the output object information input at Step S2. For example, as the information indicating the processing efficiency, the $CO_2$ discharge amount when the first output device performs the processing of the information volume input at Step S2 is presented on the presenting unit 106.

As described heretofore, the information processing apparatus 100 determines the output device to output the output information based on the output object information and the output device information relating to each of the output devices.

Thus, the information processing apparatus 100 according to the embodiment can determine an output device, of the output devices, according to the output object information including information on the output object.

The information processing apparatus 100 according to the embodiment can determine, out of the output devices connected to the network, an output device (a first output device) having the highest processing efficiency when the processing corresponding to the information volume included in the output object information is performed.

In addition, the information processing apparatus 100 according to the embodiment calculates the processing efficiency of each output device based on the usage information 154 of each output device to thereby calculate the processing efficiency of each output device on a real-time basis. Use of this processing efficiency in determining a specific output device enables an output device appropriate according to more current processing efficiency of the output device to be determined.

The information processing apparatus 100 according to the embodiment has a computer-based hardware configuration including a control unit such as a central processing unit (CPU), a storage unit such as read only memory (ROM) and random access memory (RAM), an external storage unit such as a hard disk drive (HDD) and a CD drive, a display unit such as a display, and an input device such as a keyboard and a mouse.

A presentation program to be executed by the information processing apparatus 100 according to the embodiment is provided by being recorded in a computer-readable storage medium such as CD-ROM, a flexible disk (FD), a CD-R, and a digital versatile disk (DVD) as a file in an installable format or an executable format.

The presentation program to be executed by the information processing apparatus 100 according to the embodiment may be configured so as to be provided by being stored in a computer connected to a network, such as the Internet, and later downloaded over the network. The presentation program to be executed by the information processing apparatus 100 according to the embodiment may even be configured so as to be provided or distributed over a network, such as the Internet.

The presentation program to be executed by the information processing apparatus 100 according to the embodiment may still be configured so as to be incorporated in advance in, for example, the ROM.

The presentation program to be executed by the information processing apparatus 100 according to the embodiment has a modular configuration including each of the above-described elements (the receiving unit 101, the arithmetic logic unit 102, the calculating unit 103, the determining unit 104, the presenting unit 106, and the collecting unit 107). A CPU (processor) as actual hardware reads an output device control program from the storage medium and executes it. This loads each of the abovementioned elements on main storage, creating the elements (the receiving unit 101, the arithmetic logic unit 102, the calculating unit 103, the determining unit 104, the presenting unit 106, and the collecting unit 107) on the main storage.

According to the embodiment, it is possible to determine, out of a plurality of output devices, an output device according to the output object information including the information on the output object.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus, comprising:
a memory storing information of an event type in association with at least one corresponding output mode required for the event type;
a network interface; and
a processor configured to
receive, from a first device via the network interface, first usage data indicating use of the first device in a first output mode, the first usage data having a first format,
receive, from a second device via the network interface, second usage data indicating use of the second device in a second output mode, the second output mode being different than the first output mode, the second usage data having a second format, each of the first usage data and the second usage data including a corresponding power consumption and an operating time,
receive output data information regarding output data to be output, the output data information including an input event type,
determine, using the information of the event type stored in the memory, one or more output modes for the input event type,
calculate first processing efficiencies from the first usage data and second processing efficiencies from the second usage data, the first processing efficiencies and the second processing efficiencies each having a third format, wherein the processor is configured to calculate the first and second processing efficiencies from the power consumption and the operating time of the first and second devices, respectively, in a predetermined time period, and
determine a device from among the first device and the second device, based on the calculated first and second processing efficiencies, for outputting the output data in the first or second output mode, respectively, the output data information, and the determined one or more output modes for the input event type, the determined device having higher processing efficiencies than processing efficiencies of the other device when the output data is output in the first or second output mode, respectively, in accordance with the determined one or more output data modes.

2. The information processing apparatus according to claim 1, wherein
the first processing efficiencies and the second processing efficiencies are in terms of power consumption per unit time.

3. The information processing apparatus according to claim 1, wherein
the first usage data includes a first carbon dioxide discharge amount, associated with a first power consumption and a paper output count of the first device,
the second usage data includes a second carbon dioxide discharge amount, associated with a second power consumption of the second device, and
the first processing efficiencies and the second processing efficiencies include terms of a carbon dioxide discharge amount per unit time.

4. The information processing apparatus according to claim 1, wherein the processor is configured to cause output of device information regarding the determined device on an output screen.

5. The information processing apparatus according to claim 4, wherein the output screen displays information regarding the higher processing efficiencies.

6. The information processing apparatus according to claim 1, wherein the output data information includes a volume of the output data.

7. An information processing system, comprising:
a storage device including memory, the storage device being configured to
store information of an event type in association with at least one corresponding output mode required for the event type,
store first usage data indicating use of a first device in a first output mode, the first usage data having a first format, and
store second usage data indicating use of a second device in a second output mode, the second output mode being different than the first output mode, the second usage data having a second format, each of the first usage data and the second usage data including a corresponding power consumption and an operating time; and
a processor configured to
receive output data information regarding output data to be output, the output data information including an input event type,
determine, using the information of the event type stored in the memory, one or more output modes for the input event type,
calculate first processing efficiencies from the first usage data, and second processing efficiencies from the second usage data, the first processing efficiencies and the second processing efficiencies each having a third format, wherein the processor is configured to calculate the first and second processing efficiencies from the power consumption and the operating time of the first and second devices, respectively, in a predetermined time period, and
determine a device from among the first device and the second device, based on the calculated first and second processing efficiencies for outputting the output data in the first or second output mode, respectively, the output data information, and the determined one or more output modes for the input event type, the determined device having higher processing efficiencies than processing efficiencies of the other device when the output data is output in the first or second output mode, respectively, in accordance with the determined one or more output data information modes.

8. The information processing system according to claim 7, wherein
the first processing efficiencies and the second processing efficiencies are in terms of power consumption per unit time.

9. The information processing system according to claim 7, wherein
the first usage data includes a first carbon dioxide discharge amount, associated with a first power consumption and paper output count of the first device,
the second usage data includes a second carbon dioxide discharge amount, associated with a second power consumption of the second device, and
the first processing efficiencies and the second processing efficiencies include terms of a carbon dioxide discharge amount per unit time.

10. The information processing system according to claim 7, wherein the processor is configured to cause output of device information regarding the determined device on an output screen.

11. The information processing system according to claim 10, wherein the output screen displays information regarding the higher processing efficiencies.

12. The information processing system according to claim 7, wherein the output data information includes a volume of the output data.

13. An information processing method, comprising:
storing, in a memory, information of an event type in association with at least one corresponding output mode required for the event type;
sending, to an information processing apparatus from a first device, first usage data indicating use of the first device in a first output mode, the first usage data having a first format;
sending, to the information processing apparatus from a second device, second usage data indicating use of the second device in a second output mode, the second output mode being different than the first output mode, the second usage data having a second format, each of the first usage data and the second usage data including a corresponding power consumption and an operating time;
sending, to the information processing apparatus, output data information regarding output data to be output, the output data information including an input event type;
determining, using the information of the event type stored in the memory, one or more output modes for the input event type, and
outputting on an output display screen device information regarding a determined device, the device being determined by the information processing apparatus, from among the first device and the second device, based on calculated first and second processing efficiencies for outputting the output data in the first or second output mode, respectively, each having a third format, the output data information, and the determined one or more output modes for the input event type, wherein the first and second processing efficiencies are calculated from the power consumption and the operating time of the first and second devices, respectively, in a predetermined time period,
wherein the determined device has higher processing efficiencies than processing efficiencies of the other device when the output data is output in the first or second output mode, respectively, in accordance with the determined one or more output modes.

14. The information processing method according to claim 13, wherein
the first processing efficiencies and the second processing efficiencies are in terms of power consumption per unit time.

15. The information processing method according to claim 13, wherein
the first usage data includes a first carbon dioxide discharge amount, associated with a first power consumption and paper output count of the first device,
the second usage data includes a second carbon dioxide discharge amount, associated with a second power consumption of the second device, and
the first processing efficiencies and the second processing efficiencies include terms of a carbon dioxide discharge amount per unit time.

16. The information processing method according to claim 13, wherein said outputting includes outputting device information regarding the determined device on an output screen.

17. The information processing method according to claim 16, wherein the output screen displays information regarding the higher processing efficiencies.

18. The information processing method according to claim 13, wherein the output data information includes a volume of the output data.

19. A non-transitory computer-readable storage medium with an executable program stored thereon, which when executed by a computer, instructs the computer to cause performance of a method comprising:

storing, in a memory, information of an event type in association with at least one corresponding output mode required for the event type;

sending, to an information processing apparatus from a first device, first usage data indicating use of the first device in a first output mode, the first usage data having a first format;

sending, to the information processing apparatus from a second device, second usage data indicating use of the second device in a second output mode, the second output mode being different than the first output mode, the second usage data having a second format, each of the first usage data and the second usage data including a corresponding power consumption and an operating time;

sending, to the information processing apparatus, output data information regarding output data to be output, the output data information including an input event type;

determining, using the information of the event type stored in the memory, one or more output modes for the input event type; and outputting on an output display screen device information regarding a determined device, the device being determined by the information processing apparatus, from among the first device and the second device, based on calculated first and second processing efficiencies for outputting the output data in the first or second output mode, respectively, each having a third format, the output data information, and the determined one or more output modes for the input event type, wherein the first and second processing efficiencies are calculated from the power consumption and the operating time of the first and second devices, respectively, in a predetermined time period, wherein the determined device has higher processing efficiencies than processing efficiencies of the other when the output data is output in the first or second output mode, respectively, in accordance with the determined one or more output modes.

* * * * *